United States Patent Office 3,453,346
Patented July 1, 1969

3,453,346
CRYSTALLINE BLOCK COPOLYMERS OF ETHYLENE, PROPYLENE AND 1-OLEFINS WITH VINYL CHLORIDE AND/OR VINYLIDENE CHLORIDE
Hugh John Hagemeyer, Jr., and Marvin Becton Edwards, Longview, Tex., assignors to Eastman Kodak Company, Rochester, N.Y., a corporation of New Jersey
No Drawing. Continuation-in-part of applications Ser. No. 505,227, Oct. 26, 1965, which is a continuation-in-part of application Ser. No. 152,001, Nov. 13, 1961, which in turn is a continuation-in-part of application Ser. No. 28,826, May 13, 1960. This application Sept. 30, 1966, Ser. No. 583,479
Int. Cl. C08f 15/40
U.S. Cl. 260—878  7 Claims

ABSTRACT OF THE DISCLOSURE

A crystalline block polymer wherein the polymer chains consist essentially of at least one block of a polymerized 1-olefin and at least one block of a polymerized member selected from the group consisting of vinyl halide and vinylidene halide. The block polymer exhibits improved physical properties such as stiffness, flexure and tensile strength.

---

This application is a continuation-in-part of copending application Ser. No. 505,227 filed Oct. 26, 1965, which is a continuation-in-part of application Ser. No. 152,001 filed Nov. 13, 1961, now abandoned, which is a continuation-in-part of copending Ser. No. 28,826 filed May 13, 1960.

This invention relates to novel polymers and methods for preparing the same. More particularly, the present invention relates to novel, solid crystalline polymers prepared from 1-olefins, such as ethylene and propylene, and vinyl halides such as vinyl chloride or a vinylidene halide, suhc as vinylidene chloride, and mixtures thereof, and to the process for their preparation.

In recent years, a number of high molecular weight polymers having a crystalline structure have been prepared, particularly from olefins, by subjecting the monomer to relatively mild conditions of temperature and pressure in the presence of solid stereospecific polymerization catalysts. Such polymers have been used extensively in a number of different applications including, for example, use in fibers, molding and coating applications, depending upon the specific properties of the polymer. The prior art crystalline polymers are, however, deficient as wholly desirable polymers for many uses since they do not exhibit the combination of good stiffness, tensile strength, elongation, impact strength, hardness and brittle point necessary for such uses. Thus, crystalline polyethylene and polypropylene, although they do exhibit a number of good physical properties, do not exhibit optimum stiffness in flexure and tensile strength which are so advantageous in injection molding, film and fiber applications. It is evident, therefore, that the state of the art will be greatly enhanced by providing a crystalline polymer which combines exceptionally high stiffness in flexure and tensile strength with many of the very desirable physical properties of prior art crystalline polymers. Likewise, a noteworthy contribution to the art will be methods for preparing such polymers.

Accordingly, it is an object of this invention to provide novel crystalline polymers.

Another object of this invention is to provide novel crystalline polymers which exhibit a combination of properties heretofore unattainable with crystalline polymers.

Still another object of this invention is to provide novel crystalline polymers having significantly improved specific properties, for example, stiffness in flexure and tensile strengths, when compared with prior art crystalline polymers.

Still another object of this invention is to provide novel crystalline polymers which, by virtue of their improved combination of properties, are particularly useful in molding applications where they exhibit superior moldability, low mold shrinkage, lower densities, better mold finish, as well as having optimum film and fiber forming properties when compared with most crystalline prior art polymers.

Still another object of this invention is to provide novel processes for preparing the aforementioned novel crystalline polymers.

Other objects will become apparent from an examination of the description and claims that follow.

In order to accomplish these objects it was necessary to prepare entirely new crystalline polymers, i.e., polymers which are 100 percent insoluble in boiling hexane and show a high degree of crystallinity by X-ray diffraction, which differ markedly from prior art crystalline polymers in chemical composition and combination of physical properties. These novel polymers are solid, crystalline polymers in which the polymer chains comprise separate and distinct homopolymerized segments. There are numerous types of novel polymers of this invention depending upon the nature and number of segments. Thus, there are di-hydrocarbon novel crystalline polymers in which each of the segments are polyhydrocarbon, for example, segments of polymerized olefinic hydrocarbons and hydrocarbonvinyl polymers or mixtures thereof, as exemplified by ethylene, propylene, butene-1, vinyl chloride, vinylidene chloride and the like. Still other types of novel crystalline polymers of this invention are ternary polymers in which the major portion of the polymer chain is segments of hydrocarbon, for example, polymerized propylene, and the minor portion of the polymer chain is segments of polymerized styrene and vinyl compounds, for example, vinyl chloride. Still other types of novel crystalline polymers of this invention are those in which the major portion of the polymer is segments of polymerized propylene and the minor portion of the polymer is segments of polymerized ethylene and vinyl chloride or vinylidene chloride. This type of polymer is a ternary and would be designated propylene-ethylene-vinyl chloride or vinylidene chloride polymers.

The novel polymers of this invention are not to be confused with prior art copolymers, amorphous or crystalline, since these prior art copolymers do not exhibit the excellent combination of properties or the chemical structure exhibited by the novel polymers. Thus, as exemplified by U.S. Patent 2,918,547, a propylene-butene copolymer can be prepared in slurry phase in an inert reaction medium by the simple expedient of subjecting a mixture of propylene and butene to polymerization conditions in the presence of a solid, stereospecific polymerization catalyst. However, this type of process results in a copolymer having a random distribution of each of the polymerized monomers in the polymer chain and does not exhibit the stereoregular structure characteristic of novel polymers of this invention. The random copolymers of the prior art exemplified by this U.S. Patent 2,918,457 contain polymer chains which can be represented by the structure AABABBABA. In contrast, the novel crystalline polymers of this invention can be represented as containing polymer chains represented by the formula AAAAABB wherein A and B are polymerized monomers, AAAAA is the segment of the major portion, and BB is the segment of the minor portion. It is the precise arrangement of the polymerized monomers in the polymer chains of novel polymers of this invention that makes it possible for the polymers to exhibit the excellent combination of physical properties which distinguish them from crystalline polymers prepared heretofore.

Also, in prior art polymers prepared from two or more polymerizable monomers, it has often been found that the polymer is a blend containing large amounts of mixtures of homopolymers prepared from each of the polymers. These blends are, of course, quite distinct from the novel polymers of this invention since the latter contain the polymer components in a single polymeric chain. In preparing the novel polymers of this invention it is advantageous to use no more polymerizable monomer in the process than can be incorporated in the polymer chains of the polymer, the exact amounts being determinable by the polymer being produced and the polymerization conditions employed. By operating in this manner, it is possible to avoid the production of a poly blend or a prior art type of copolymer. Thus, the novel crystalline polymers can be prepared by polymerizing a segment of a polymerizable monomer onto a preformed segment of the polymer chain formed from a different polymerizable monomer using a solid stereospecific polymerization catalyst.

The 1-olefin crystalline polymers in which the polymer chains are polymerized olefin segments joined to segments of polymerized halide monomer are of particular interest. Thus, these 1-olefin-vinyl halide and 1-olefin vinylidene halide novel polymers exhibit an exceptionally increased stiffness in flexure and tensile strength when compared with either prior art crystalline polymers, for example, crystalline polypropylene or propylene polymers containing segments of polymerizable monomers different from vinyl halide or vinylidene halide. The exceptionally increased stiffness in flexure and tensile strength exhibited by the 1-olefin-vinyl halide and 1-olefin-vinylidene halide polymers are combined with the other desirable properties reported for prior art crystalline polymers such as crystalline polypropylene even when very small amounts of halide monomer, for example, less than 1 percent, by weight are present in the novel polymers.

The novel polymers of this invention are characterized by a high degree of crystallinity, high stiffness in flexure, high tensile values, and elevated softening points.

The novel polymers of this invention can contain varying amounts of each of the monomers in polymeric form in a single chain, as is obvious to one skilled in the art. A wide variation of specific properties can be achieved by appropriate selection of the monomers employed, the amounts of each monomer employed in preparing the novel polymers, polymerization conditions, and ratio of catalyst components used in forming the polymer. For example, propylene polymers in which the minor portion is segments of polymerized vinyl chloride and which contain only 0.4 percent, by weight, of polymerized vinyl chloride, exhibit a stiffness in flexure of 196,700 p.s.i., while a propylene polymer of comparable melt index, in which the minor portion is segments of polymerized vinyl chloride and which contains 1.0 percent, by weight, of polymerized vinyl chloride, exhibits a stiffness in flexure of 215,000 p.s.i.

As already indicated, 1-olefin crystalline polymers in which the minor portion is segments of polymerized vinyl halide or vinylidene halide are of particular interest by virtue of their desirable combination of properties, including very high stiffness in flexure and tensile strengths, even with relatively small percentages for example, 5 percent or less, by weight, of vinyl halide in the polymer. In order to obtain these propylene polymers exhibiting the optimum combination of physical properties it is desirable that the polymer contain at least 80 percent, by weight, of polymerized 1-olefin and at least about 0.1 percent, by weight, of vinyl halide or vinylidene halide in polymerized form. Thus, very desirable 1-olefin polymers are those which contain segments of polymerized 1-olefin and segments of vinyl halide or vinylidene halide in polymerized form, which polymers contain about 80 to about 99.9 percent, by weight, of polymerized 1-olefin and about 0.1 to about 20 percent, by weight, of halide monomer in polymerized form. In general, such 1-olefin polymers will exhibit molecular weights (Staudinger) of at least 10,000 and preferably molecular weights in the range of about 15,000 to about 270,000. The molecular weights of these polymers can be readily determined from the inherent viscosity in Tetralin at 145° C. using the Staudinger equation. Thus, the inherent viscosity of these polymers in Tetralin at 145° C. is at least 0.40 and is preferably in the range of about 0.55 to about 2.4. In addition, these polymers exhibit densities (ASTM D1505–57T) of at least 0.85, with densities in the range of about 0.87 to about 0.92 being preferred.

As already indicated, the novel polymers of this invention are prepared in a two or more stage polymerization procedure comprising initially polymerizing the polymerizable 1-olefin, for example, propylene and then polymerizing at least one different polymerizable monomer, for example, a vinyl halide, such as vinyl chloride or a vinylidene halide, such as vinylidene chloride, in the presence of the polymer chain of the first monomer using a solid stereospecific polymerization catalyst. Thus, propylene, for example, is contacted with a solid stereospecific polymerization catalyst to form a crystalline polymer chain and the second monomer is then polymerized onto the preformed polymer chain in the presence of the solid stereospecific catalyst. To prepare the most desirable 1-olefin crystalline polymers in which the polymer chains contain segments of polymerized 1-olefin joined to segments of polymerized vinyl halide or vinylidene halide, the polymerization reaction is continued until the resulting polymer contains at least 80 percent, by weight, of polymerized olefin. This process can be conducted in a single reactor having separate reaction zones, preferably separated by a baffle or other separation means. However, the separate polymerization reactions forming our process can also be conducted in separate reactors arranged in series and alternatively the entire process can be carried out in an elongated tubular recator. The novel polymers of this invention can also be produced by carrying out the first stage of the polymerization with a polymerizable monomer, for example, propylene and adding the second monomer, after a portion of the first monomer, for example, 20–30 percent, has been polymerized. The exact amount of monomer fed after the first stage of the reaction is subject to wide variation depending upon such variables as the reaction conditions employed, the percent of monomer converted in the first stage, the desired molecular weight of the resulting polymer and similar factors. Consequently, the amount of monomer fed in a specific situation will depend upon the correlation of the several variable factors. However, in the case of halide monomer, the novel polymers of this invention exhibiting the exceptional stiffnesses and tensile values referred to hereinabove, will be such that the resulting polymer contains at least 0.1 percent, by weight, of the halide monomer in polymerized form, and preferably at least 80 percent, by weight, of 1-olefin in polymerized form.

The solid stereospecific polymerization catalysts that are employed in practicing this invention are an important feature of the process. A number of these solid stereospecific catalysts are known in the prior art. These catalysts are initially mixtures of at least two components, the first component being, for example, a halide of a transition element from the fourth to the sixth subgroups of the Periodic Table and the second component being a metal of Group I–A or II or aluminum, or an alloy of metals of Group I–A and/or II and/or aluminum, or a halide or organometallic compound of a metal of Group I–A or II and/or aluminum, or a complex hydride or a complex organometallic compound of boron or aluminum and a metal of Group I–A or II of the Periodic Table found in "Lange's Handbook of Chemistry," 8th edition (1952), published by Handbook Publishers, Inc., at pages 56 and 57, for example.

The transition metals included in Groups IV-B to VI-B of the Periodic Table are exemplified by metals such as titanium, zirconium, vanadium, molybdenum, chromium and the like. The transition metal halide catalyst components can be used at their maximum valence, or if desired a reduced valency form of the halide can be employed. It is preferred to use the titanium chlorides which can be in the form of titanium tetrachloride, titanium trichloride or titanium dichloride. Examples of other transition metal halides that can be employed in the process of this invention include titanium tetrabromide, titanium tribromide, zirconium, tetrachloride, zirconium tetrabromide, vanadium trichloride, molybdenum pentachloride, chromium trichloride and the like.

Suitable second components which can be employed in conjunction with the transition element halides to form an effective solid, stereospecific polymerization catalyst include, for example, metal alkyls, metal alkyl halides and metal hydrides of aluminum or Group I-A and II as well as the metals alone. The preferred component is a lithium compound, as exemplified by lithium metal, lithium alkyl, lithium aluminum hydride, lithium aluminum alkyls, lithium borohydride and lithium aluminum compounds having the formula:

$$LiAlH_xR_y$$

wherein $x$ and $y$ are integers from 0 to 4, the sum of $x$ and $y$ is 4 and R is a hydrocarbon radical. Suitable Group I-A or II meals include sodium, potassium, lithium, zinc and the like. The alloys, halides, hydrides or organometallic compounds of these metals which can be employed include, for example, sodium amyl, potassium butyl, lithium propyl, zinc dibutyl, zinc diamyl, zinc dipropyl, ethyl magnesium bromide, sodium hydride, calcium hydride, lithium aluminum hydride and the like. Also, the catalyst composition can contain an organo aluminum compound such as aluminum triethyl, aluminum tributyl, ethyl aluminum dichloride, cyclohexyl aluminum dichloride, cyclobutyl aluminum dichloride, ethyl aluminum dibromide, ethyl aluminum sesquichloride, ethyl aluminum sesquibromide, dimethyl aluminum bromide, propyl aluminum dichloride, dibutyl aluminum chloride, diethyl aluminum chloride and the like. If desired a third component can be employed in order to increase the stereospecificity of the catalyst. Suitable third components include the halides of alkali metals, magnesium oxide, aromatic ethers, for example, diphenyl ether, hydrides of sodium, potassium and lithium and alcoholates of sodium, potassium, lithium, calcium, magnesium, barium, strontium, aluminum, titanium and zirconium. In addition, it is often desirable to employ tertiary amines and tertiary phosphoramides as third components with alkyl aluminum halides.

Catalysts employing lithium, lithium alkyls, lithium aluminum hydride, lithium hydride and lithium aluminum tetraalkyls in combination with the reduced valency form of the transition elements from the fourth to the sixth group of the Periodic Table are preferred for high temperature solution or melt polymerization procedures. These catalysts are particularly effective at temperatures above 120° C., for example, at 150° C. or higher, and, at these elevated temperatures, it is possible to obtain propylene polymers containing less than 5 percent and preferably less than 1 percent, by weight, of an halide monomer. As pointed out previously, such propylene polymers exhibit a combination of physical properties that are completely unexpected, particularly in view of the small amounts of halide monomers present therein.

Generally, a mole ratio of second component to metal halide of 0.1:1 to 12:1 is satisfactory in the practice of the process. Where a third component is employed, the mole ratios of metal halide to third component of 0.25:1 to about 1:1 are generally satisfactory. The concentration of the catalyst in the reaction medium can be varied over a wide range. For example, catalyst concentrations of 0.1 percent or less, up to 3 percent or more can be used.

The temperature of the polymerization processes can be widely varied. However, temperatures ranging from about 0° C. to about 300° C. can generally be employed. When solid, stereospecific catalysts containing second components other than lithium and lithium compounds are employed, it is desirable to use temperatures of 100° C. or less. In slurry polymerization at temperatures below 100° C., for example, 80° C. the inherent viscosities of polymer can be controlled by the use of a chain terminating agent, for example, hydrogen. In melt or solution polymerization at temperatures above 110° C., desirably above 130° C., and preferably above 150° C., the inherent viscosity is easily controlled by selection of the reaction temperature and, to a lesser extent, by controlling pressure.

A suitable pressure range for the preparation of the novel polymers of this invention includes pressures from atmospheric to pressures of about 2000 atmospheres or more. Generally, it is desirable to use pressures in excess of 15 or even 30 atmospheres, with pressures in the range of about 50 to about 100, or even 500 atmospheres often being used in order to obtain satisfactory rates of reaction. Elevated pressures, for example, 1 to 1500 atmospheres are often required for polymerization reactions run in the absence of a solvent. The gas dissolved in the molten polymer is generally one to four times the weight of the polymer. This dissolved gas gives low viscosities in reactor space which is essential to good heat transfer and good catalyst distribution.

The organic vehicles or solvents that can be employed as reaction media in the process of this invention include aliphatic alkanes or cycloalkanes such as propane, pentane, hexane, heptane, cyclohexane and the like, or hydrogenated aromatic compounds such as tetrahydronaphthalene or decahydronaphthalene or a high molecular weight liquid paraffin or mixture of paraffins which are liquid at the reaction temperature or an aromatic hydrocarbon such as benzene, toluene, xylene and the like. The nature of the vehicle or solvent is subject to considerable variation but the solvent should be in liquid form at the reaction conditions and relatively inert to the reactants and reaction products. Other compounds that can be employed with good results include ethyl benzene, isopropyl benzene, ethyl toluene, n-propyl benzene, the diethyl benzenes, mono and dialkyl naphthalenes, n-pentane, n-octane, isooctane, methyl cyclohexane, mineral spirits and any of the other well known inert hydrocarbons.

In forming the 1-olefin crystalline polymers exhibiting optimum stiffnesses and tensile values, the 1-olefins used to prepare the segments of the major portion of the polymer are desirably the readily polymerizable 1-olefins containing 2 to 10 carbon atoms, and having the formula, $$H_2C=CHR$$

where R is a hydrogen or an alkyl radical containing 1 to 8 carbon atoms. Suitable 1-olefins, therefore include, ethylene, propylene, 1-hexene, 1-decene, 1-butene and the like.

Vinyl halide and vinylidene halides useful in preparing the segments of the minor portion of these olefin polymers having optimum stiffnesses and tensile values, are desirably the readily polymerizable vinyl halides corresponding to the formula, $$H_2C=CR_1R_2$$

wherein $R_1$ is a hydorgen or halide and $R_2$ is a halide. The useful halides are fluoride, chloride, bromide and iodide. Thus, halides, such as vinyl chloride, vinyl bromide, vinylidene chloride, vinyl fluoride, vinylidene bromide and the like may be used.

This invention can be further illustrated by the following examples of preferred embodiments thereof although it will be understood that these examples are included merely for purposes of illustration and are not intended to limit the scope of the invention unless otherwise specifically indicated.

EXAMPLE I

To 150 ml. of dry mineral spirits which had been further treated by passing over silica gel, were added 1.5 g. of lithium aluminum hydride and 6 g. of hyrogen-reduced titanium trichloride. After mixing, the catalyst was further diluted with 250 cc. of mineral spirits treated as above and the whole was charged to a 2-liter autoclave. The autoclave was heated to 150° C. and pressured with propylene to 1000 p.s.i.g. At the end of two hours, 500 cc. of mineral spirits containing 5 g. of vinyl chloride was pumped into the autoclave. The polymerization was continued for thirty minutes. After cooling, the polymer was discharged from the autoclave and treated with alcoholic hydrochloric acid to remove catalyst residues. The yield was 280 g. of a propylene vinyl chloride copolymer with an inherent viscosity of 1.15 and a vinyl chloride content of 0.4 percent. Properties of the polymer are listed in Table I.

EXAMPLE II

This preparation of a propylene-vinyl chloride block copolymer was as in Example I. The yield of polymer in this case was 325 g. with an inherent viscosity of 1.14, and the propylene vinyl chloride block copolymer contained 0.5% vinyl chloride. The properties of the polymer are listed in Table I.

TABLE I

|  | Polypropylene | Polypropylene-Vinyl Chloride Polymers | |
| --- | --- | --- | --- |
|  |  | Ex. I | Ex. II |
| Percent Vinyl Chloride | 0 | 0.4 | 0.5 |
| Density (ASTM D1505) | 0.9086 | 0.9125 | 0.9205 |
| Brittleness Temperature, ° C. (ASTM D746) | >+26 | >+20 | >+20 |
| Inherent Viscosity in Tetralin 0.25 conc. at 145° C | 1.70 | 1.15 | 1.14 |
| Tensile Strength at 2 in./min. (ASTM D638) at Yield | 4540 | 5100 | 5200 |
| Stiffness in Flexure p.s.i. (ASTM D747) | 125,000 | 193,700 | 206,100 |
| Vicat Softening Point (ASTM D1525) | 144 | 151 |  |

EXAMPLES III–V

Crystalline block copolymers comprised of ethylene, propylene, or butene-1 containing blocks of vinyl chloride were produced by high-temperature solution polymerization in a continuous two-reactor system. In the first stirred tubular reactor the feed was mineral spirits solvent, and ethylene, or propylene, or butene-1, and the catalyst slurry. The catalyst slurry was a suspension of lithium metal, lithium aluminum hydride, titanium trichloride, and sodium fluoride at a mole ratio of 2:0.5:1:1. The first reactor was fed to the second stirred tubular reactor pressure. The feed rates were adjusted to give a solids content in the reactor of 20–30%. The effluent from the first reactor was fed to the second stirred tubular reactor which was also operated at 1000 p.s.i.g and 160° C. Vinyl chloride was fed to the second reactor at a rate such that between 0.5 and 2% vinyl chloride was added to the polyolefin chain in the form of a block.

From the second reactor the polymer solution was let down to a dilution tank where unreacted olefin was flashed off and fresh mineral spirits added to yield a solution containing 5–7% solids. The diluted polymer solution was filtered to remove catalyst, then concentrated by stripping with hot olefin gas at 180°–200° C. Solvent-free polymer was extruded into strands and chopped into pellets. The pellets were extracted with hexane at reflux for 12 hours to remove amorphous materials and then dried with inert gas. These properties were run on new-make bins which contained the production for a 24-hour period. The polymers were stabilized with 0.3% dilaurylthiodipropionate and 0.1% Santowhite powder and were dry-blended and re-extruded. The vinyl chloride content of the various block copolymers was determined by gravimetric analysis for chlorine. A comparison of the property of stiffness in flexure of these block copolymers with the corresponding homopolymer is given in Table II.

TABLE II.—COMPARISON OF STIFFNESS IN FLEXURE (p.s.i.) OF BLOCK COPOLYMERS WITH HOMOPOLYMERS

| Ex. No. | Block-Copolymer | Stiffness (p.s.i.) | Homopolymer | Stiffness (p.s.i.) |
| --- | --- | --- | --- | --- |
| III | Ehtylene-Vinyl Chloride (2%) | 142,000 | Polyethylene (linear) | 85,000 |
| IV | Propylene-Vinyl Chloride (1%) | 215,000 | Polypropylene (cry.) | 135,000 |
| V | Butene-Vinyl Chloride (3.5%) | 136,000 | Polybutene-1 (cry.) | 80,000 |
| VI | Propylene-Vinylidene Chloride (1.3%) | 182,000 | Polypropylene (cry.) | 135,000 |

In addition to the increase in stiffness in flexure, the block copolymers of ethylene, propylene, and butene-1 showed increased tensile strengths and increased Vicat softening points and yet retained most of the other desirable properties of the crystalline polyolefin homopolymers.

EXAMPLE VI

Operating as in Example I, propylene was first polymerized and then 8 g. of vinylidene chloride in 150 ml. of mineral spirits was pumped into the reactor. The hot polymer solution was discharged from the autoclave through a pressure filter to remove catalyst. The polymer solution was concentrated by gas stripping and then extruded into strands and chopped into pellets. After extraction with hot hexane for six hours, the yield was 275 g. of a crystalline block copolymer containing propylene and 1.3% vinylidene chloride. The stiffness in flexure of this block copolymer is given in Table II above.

EXAMPLE VII

A propylene-vinyl chloride block copolymer was produced by polymerization in two stirred 50-gallon autoclaves. The feed to the first autoclave was liquid propylene, the catalyst slurry, and 100 p.p.m. hydrogen. The catalyst was a 2:1:3 mole ratio of ethyl aluminum sesquichloride, hexamethyl phosphoramide, and titanium trichloride and was fed at the rate of 50–60 g. per hour as a slurry in toluene. The polymerization of propylene was carried out at 80° C. and 775–795 p.s.i.g. Percent solids was maintained at 27–30%. The polypropylene-catalyst slurry from the first reactor was fed to the second stirred autoclave. Vinyl chloride was fed at a rate to give a vinyl chloride block amounting to 1.0–1.5% of the polymer. The polymer slurry from the second reactor was let down to a solids-gas separator. After flashing off unreacted propylene and vinyl chloride, the polymer was dropped to a wash tank and catalyst removal was effected by washing with isobutanol at 100–106° C. Polymer yield per unit of catalyst was 320. The stiffness in flexure was 223,000.

EXAMPLES VIII–XI

Several block copolymer preparations using both slurry and solution polymerization techniques are summarized in Table III. The polymerizations were carried out in two 1000-gallon stirred reactors in series. Vinyl chloride was fed to the second reactor only.

The reaction conditions and polymer properties of Examples VII–XI are presented in Table III.

TABLE III

| Example No.: | Catalyst | Mole ratio of Catalyst components | Polymerization Conditions | | | Polymer Components | | Stiffness in Flexure (p.s.i.) |
|---|---|---|---|---|---|---|---|---|
| | | | Solvent | Temp. (°C.) | pressure (p.s.i.g.) | 1-Olefin | Vinyl Chloride (Wt. percent) | |
| VIII | Li, LiAlH₄, TiCl₃, NaF | 2/0.5/1/0.5 | Mineral spirits | 160 | 1,000 | Propylene | 0 | 135,000 |
| IX | Li, LiAlH₄, TiCl₃, NaF | 2/0.5/1/0.5 | do | 160 | 1,000 | do | 0.7 | 212,000 |
| X | Et₃Al, TiCl₃, NaF | 1/1/1 | Cyclohexane | 75 | 400 | do | 1.3 | 206,300 |
| XI | Et₃Al, VCl₃ | 1/1/1 | Xylene | 75 | 1,200 | Ethylene | 2.0 | 131,000 |

The 1-olefin-vinyl halide and vinylidene halide polymers of this invention are preferred for many applications by virtue of their very excellent combination of physical properties, particularly their high stiffnesses and tensile strengths. By virtue of these improved properties the 1-olefin-vinyl halide polymers, can be used as substitutes for crystalline polypropylene in applications where these properties are of significance, for example, in molding, film and fiber applications. The novel 1-olefin polymers described herein of this invention have many advantages in specific uses. For example, in fibers and monofilaments the novel polymers of this invention are superior to crystalline polypropylene in that they draw down less and afford tougher filaments resulting in fewer breaks when spinning the finer deniers. Such fibers and filaments can be made in varying deniers and cross sections, and find use as staple or continuous filament yarns and tows, both bulked and unbulked. Such polymer fibers, filaments, tows and yarns find use in textile applications, rugs, industrial fabrics, batts, filters (including cigarette filters) and various other applications where their unique combination of properties make them particularly useful. Advantageous barrier properties can be attained when the olefin polymers are employed in paper coatings as well as in other surface coatings and laminates with both fibrous and non-fibrous materials, such as laminates with other resins on other novel polymers of this invention or with foils or the like. In molded and extruded articles, one very significant advantage of the novel polymers of this invention, and particularly olefin-vinyl chloride and olefin-vinylidene chloride polymers, are improved stiffness and tensile strength. Thus, blends of the olefin-vinylhalide and olefin-vinylidene chloride polymers with amorphous ethylene-propylene rubber give useful and superior molding compositions.

In all of the aforementioned uses, the ease of processability of the olefin-vinyl halide and the olefin-vinylidene halide polymers is an important advantage over many of the high molecular weight solid polymers known in the prior art, for example, high density polyethylene and acrylonitrile-butadiene-styrene polymer resins.

The olefins polymers disclosed herein can be stabilized with a variety of antioxidants, alone or in admixture. Thus for example, the N,N-dialkyl dithiocarbamates, alkyl phenyl salicylates, N,N - diphenyl-p-phenylenediamines, 2-hydroxybenzophenones or butylated hydroxy toluenes and the like can be employed with good results. Specific antioxidants which can be employed include 4,4'-butylidene-bis(6-tert, butyl - metacresol), dilauryl-3,3'-thio-dipropionate, N-butylated-p-amino phenol, N,N'-disecondary-butyl-p-phenylene-diamine, 2,6-ditertiarybutyl-p-cresol, 2,6-ditertiarybutyl-4-methyl phenol, disalicylal propylene diimine, N,N-di-salicylidene-1,2-diaminopropane, N,N'-di(1 - methylheptyl)-p-phenylenediamine, N,N'-di-2-octyl-p-phenylenediamine, N,N' - di(1-ethyl-3-methyl pentyl)p-phenylenediamine, N,N'-di-3(5-methyl heptyl)-p-phenylenediamine, N-1,N-3-dioleoyldiethylene triamine, cresylic acid, di-acetone alcohol, isopropanol, toluene, mixed xylenes, butylated hydroxyanisole, butylated hydroxytoluene, propyl gallate, citric acid, propylene glycol, vegetable oil, sodium silico aluminate, mixed glycerides, glyceryl monooleate, diisobutyl adipate or mixtures thereof. A particularly effective synergistic mixture is one comprising dilauryl thiodipropionate with 4,4-butylidene-bis(6-tert, butylmeta-cresol), or butyl hydroxy toluene. Metal soaps such as calcium stearate can be added, preferably at concentrations of 1 percent or less to enhance stability and improved mold release properties of the polymers. Slip agents such as oleamide or erucylamide or anti-block agents such as colloid silica may also be added particularly where the propylene polymers are to be used for film. Furthermore, pigments, extenders, plasticizers or fillers, as exemplified by titanium oxides, calcium hydroxide or silicates, can be added to the novel polymers of this invention. For use in fiber formation, mixtures of the novel polymers of this invention with polyesters or polyamides, for example, nylon, can be used in order to obtain improved dye affinity together with optimum fiber properties. In addition, the olefin polymers disclosed herein can be thermally degraded at temperatures above their critical temperatures to form useful products. Low molecular weight liquid and waxy polymers also can be made and show excellent adaptability for specialized uses. The novel polymers of this invention are also used in wrapping materials, fluid containers, fluid conduits or like articles.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A crystalline substantially linear block polymer in which the polymer chains consist essentially of at least one block of a polymerized 1-olefin containing 2–10 carbon atoms and at least one block of a polymerized member selected from the group consisting of vinyl halide and vinylidene halide, said block polymer exhibiting improved stiffness in flexure and tensile strength and having a molecular weight of at least 10,000, a density of at least 0.85 and containing at least 80 percent by weight of polymerized 1-olefin.

2. A crystalline substantially linear block copolymer in which the chains consist essentially of at least one block of a polymerized 1-olefin selected from the group consisting of ethylene, propylene and butene-1, and at least one block of a polymized member selected from the group consisting of vinyl chloride and vinylidene chloride, said block copolymer exhibiting improved stiffness in flexure and tensile strength and having a molecular weight of at least 10,000, a density of at least 0.85 and containing at least 80 percent, by weight, of polymerized 1-olefin.

3. The block copolymer of claim 2, wherein the 1-olefin is ethylene.

4. The block copolymer of claim 2, wherein the 1-olefin is propylene.

5. The block copolymer of claim 2, wherein the 1-olefin is butene-1.

6. The block copolymer of claim 2, wherein the polymerized member is vinyl chloride.

7. The block copolymer of claim 2, wherein the polymerized member is vinylidene chloride.

References Cited

UNITED STATES PATENTS 3,254,140   5/1966   Hagemeyer et al. ____ 260—878

FOREIGN PATENTS 235,262   7/1961   Australia.
598,109   5/1960   Canada.

MURRAY TILLMAN, Primary Examiner.

M. J. TULLY, Assistant Examiner.

U.S. Cl. X.R.

260—23, 41, 45.85, 45.9, 45.95, 857, 873, 876